United States Patent [19]

Zimmerman et al.

[11] 4,009,130

[45] Feb. 22, 1977

[54] PREPARATION OF ISOCYANURATE FOAMS USING ALKALI METAL TERTIARYAMINO DITHIOCARBAMATE SALT CATALYSTS

[75] Inventors: Robert L. Zimmerman; Thomas H. Austin; Heinz Schulze, all of Austin, Tex.

[73] Assignee: Texaco Development Corporation, New York, N.Y.

[22] Filed: June 11, 1975

[21] Appl. No.: 585,906

[52] U.S. Cl. .................. 260/2.5 AB; 260/2.5 AC; 260/2.5 AW; 260/75 NC; 260/75 NB; 260/77.5 AB; 260/77.5 AC; 260/77.5 NC

[51] Int. Cl.$^2$ ........................................ C08G 18/22

[58] Field of Search ............... 260/2.5 AB, 2.5 AW, 260/2.5 AC

[56] References Cited

UNITED STATES PATENTS 3,180,846  4/1965  Haggis ........................ 260/2.5 AW 3,715,337  2/1973  Allen et al. ................. 260/2.5 AW

FOREIGN PATENTS OR APPLICATIONS 891,007  3/1962  United Kingdom .......... 260/2.5 AB

*Primary Examiner*—Eugene C. Rzucidlo
*Attorney, Agent, or Firm*—Carl G. Ries; Thomas H. Whaley; James L. Bailey

[57] ABSTRACT

New catalysts for isocyanurate foams comprising alkali metal tertiaryamino dithiocarbamate salts. The novel foams are obtained by the polymerization of an excess of aromatic polyisocyanate, and a polyether or polyester polyol in the presence of a blowing agent and said alkali metal tertiaryamino dithiocarbamate salt useful as an isocyanurate group formation catalyst. The novel foams are useful in preparing rigid, flexible, semi-rigid or semi-flexible materials such as panels or slabs or sprayed foam surfaces.

6 Claims, No Drawings

PREPARATION OF ISOCYANURATE FOAMS USING ALKALI METAL TERTIARYAMINO DITHIOCARBAMATE SALT CATALYSTS

BACKGROUND OF THE INVENTION

1. Field of the Invention

This invention pertains to the field of isocyanurate catalysts. More particularly this invention relates to the use of alkali metal tertiaryamino dithiocarbamate salts as isocyanurate catalysts.

2. Description of the Prior Art

The use of catalysts in preparing isocyanurate foams via the polymerization of a polyol, polyisocyanate and optionally other ingredients in the presence of a blowing agent is well-known. The isocyanurate group formation catalyst is used to trimerize the isocyanate groups to form the isocyanurate linkages. The polyol essentially acts as a modifying or reactive plasticizing agent in the overall polymeric scheme since a polymer containing only isocyanurate groups is itself too friable. Thus, the isocyanurate foam contains both isocyanurate groups as well as urethane linkages, with said urethane linkages acting to plasticize the foam. Initially the reaction proceeds to give a urethane quasi-prepolymer containing active isocyanate groups which during the subsequent reaction time period trimerize to give a polymer rich in urethane linkages. Subsequently the excess isocyanate reaction to form isocyanurate groups which ultimately produces a methane modified polyisocyanurate polymer.

Depending upon process condition utilized, both rigid and flexible polyisocyanurate foams may be prepared as well as the semi-flexible and semi-rigid types. Some main uses of the resultant foam include those of thermal insulation, and as building materials and the like. Examples of some prior art isocyanurate foams and methods of preparation are described in U.S. Pat. Nos. 3,745,133; 3,644,232; 3,676,380; 3,168,483; and 3,519,950, to name a few.

A number of prior art polyisocyanurate catalysts are known. However, in many instances these catalysts suffer from one or more deficiencies. Particularly, while useful in promoting trimerization of the isocyanate groups of isocyanurate polymer unites the catalysts cause foam processing problems. Thus, in some instances such well-known catalysts as potassium octoate and potassium acetate catalysts are overly temperature dependent. Thus, an unduly rapid end — cure is realized in some cases with such catalysts. That is, with a gradual rise in temperature, catalyst activity is increased in an excessive manner, making it difficult to properly control foam rise. Yet, in many cases, typified by slab formation, a uniform cure rate is particularly sought.

In other situations catalysts such as amine-type isocyanurate catalysts including amino hexahydrotriazines are unduly slow with respect to their reactivity rate resulting in a lagging end — cure. As a result, the foam so cured is not sufficiently cured in time to properly handle. The soft green foam coming out of the machine will have a tendency to warp if, for example, panel board is being produced.

It would therefore be a considerable advance in the art if a new class of isocyanurate catalysts were discovered which overcomes the just discussed processing drawbacks whereby optimum foam cure rates could be achieved. It would be a further desirable achievement if such new class of isocyanurate chemical catalysts could be equally adopted in preparing isocyanurate foams useful as both rigid and flexible foams in making panels, slabs and spray foam.

It therefore is an object of the present invention to provide new isocyanurate catalysts. It is further an object of this invention to provide isocyanurate catalysts which can be utilized in preparing rigid, flexible, semi-rigid or semi-flexible isocyanurate foams. Another object of the present invention is to provide isocyanurate foams utilizing a new class of isocyanurate group formation catalysts. Finally, it is an object of the present invention to prepare modified polyisocyanurate foams which have suitable thermal stability, uniform cell structure, low friability, excellent adhesion and other sought-after properties, using a new class of isocyanurate catalysts.

SUMMARY OF THE INVENTION

It has now been found that certain alkali metal tertiaryamino dithiocarbamate salts are extremely useful as catalysts in preparing modified cellular polyisocyanurate foams. Said foams are prepared by reacting together in the presence of a blowing agent a polyether or polyester polyol and an aromatic polyisocyanate utilizing as an isocyanurate group formation catalyst an alkali metal tertiaryamino dithiocarbamate salt chemical. The resultant cellular polymer thus contains both reoccurring isocyanurate and urethane linkages or polymer groups. Foams are prepared by carrying out the polymerization reaction in the presence of a blowing agent.

Greatly preferred alkali metal tertiaryamino dithiocarbamate salts have the following structures:

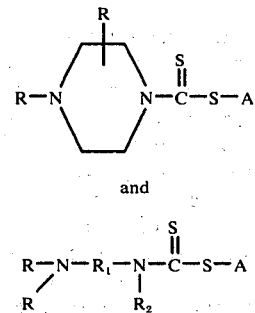

and $$R-N(R)-R_1-N(R_2)-\overset{S}{\underset{\|}{C}}-S-A$$

where R is a lower alkyl radical, $R_1$ is a lower alkylene radical, $R_2$ is hydrogen or a lower cyanoalkyl radical, and A represents an alkali metal.

DETAILED DESCRIPTION OF THE INVENTION

The isocyanurate foams of the present invention are prepared by mixing a polyisocyanate, a polyether or polyester polyol, an inert blowing agent and an alkali metal tertiaryamino dithiocarbamate salt as an isocyanurate group formation catalyst under conventional foaming conditions utilizing conventional mixing devices employed in the manufacture of polymer foams. The mixing of the materials for the formulation of the reaction product is not critical to the invention. Examples of conventional polymer foam formation processes and equipment are described in Ferrigno, "Rigid Plastic Foams," Reinhold Publishing Corporation, New York, New York, 1963.

The alkali metal tertiaryamino dithiocarbamate salts are most preferably chemical compounds following within the following structural formulae:

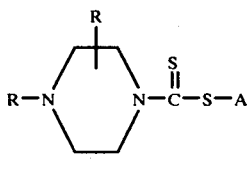

and

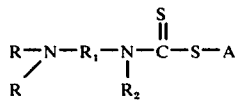

where R is a lower alkyl radical, $R_1$ is a lower alkylene radical, $R_2$ is hydrogen or a lower cyanoalkyl radical, and A represents an alkali metal.

Greatly preferred dithiocarbamate salts include

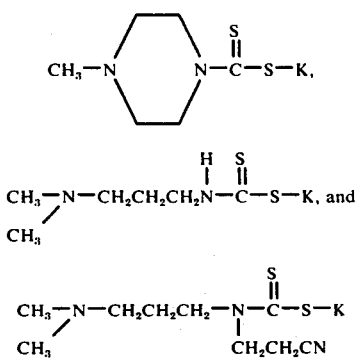

The catalysts of the invention may be prepared simply and appropriately by reacting the precursor diamino compound containing a tertiaryamino group with carbon disulfide in presence of an alkali metal hydroxide such as potassium hydroxide or sodium hydroxide. Thus, such amines as N-methyl piperazine or any N-lower alkyl piperazine or C-substituted piperazine compound may be so reacted. Likewise, any N,N-di-loweralkyldiamine may be reacted with the carbon disulfide reagent in presence of base to synthesize the sought-after dithiocarbamate salt. Exemplary compounds of this type include the dithiocarbamate salts prepared from N,N-di-loweralkylmethylene-, ethylene-, or propylenediamines. Thus, the radical represented by R in the above structural formulae may be methyl, ethyl, propyl, including n-propyl and isopropyl, n-butyl, isobutyl and t-butyl, etc. Such lower alkyl radicals then contain 1–4 carbon atoms. $R_1$ may be any alkylene radical containing 1–4 carbon atoms, including methylene, ethylene, propylene, and butylene. When $R_2$ is lowercyanoalkyl, it is preferably cyanoethyl. Such compounds are prepared by reacting the appropriate diamine with acrylonitrile, followed by carbon disulfide reaction.

Any aromatic polyisocyanate may be used in the practice of the instance invention. Typical aromatic polyisocyanates include m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene disi-ocyanate, naphthalene-1,4-diisocyanate, diphenylene-4,4'-diisocyanate; aliphatic-aromatic diisocyanates, such as xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures. These latter isocyanate compounds are generally produced by the phosgenation of corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenylisocyanate isomers with the remainder being polymethylene polyphenyl isocyanates having higher functionalities and higher molecular weights. Typical of these are polyphenyl polyisocyanate mixtures containing about 20 to 100 weight percent methylene diphenylisocyanate isomers, of which 20 to about 95 weight percent thereof is the 2,4'-isomer, with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Any conventional polyether or polyester polyol may be used in making the isocyanurate foams here. Illustrative of these one can mention the following types:

a. Polyoxyalkylene polyols including the adducts of alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like. The alkylene oxides employed in producing the polyoxyalkylene polyols normally have from 2 to 4 carbon atoms. Propylene oxide and mixtures of propylene oxide with ethylene oxide are preferred. It is known that the random or block structures can be obtained depending upon the particular known procedures used for their preparation.

b. Polyesters of polyhydric alcohols and polycarboxylic acid such as those prepared by the reaction of an excess of ethylene glycol, propylene glycol, 1,1,1-trimethylolpropane, glycerol, or the like, with phthalic acid, adipic acid, and the like.

c. Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol.

d. Phosphorus-containing derivatives such as tris(dipropylene)glycol phosphite and other phosphites.

e. The polymer/polyols produced by the in situ polymerization of a vinyl monomer in a polyol, as disclosed in U.S. Pat. Nos. 3,304,273, 3,383,351 and 3,523,093.

The foregoing are merely illustrative and represent only a small number of the many polyols known in the art that can be employed with the alkali metal tertiaryaminoalkyl dithiocarbamate catalyst salts in the process of this invention.

The polyol or polyol mixture employed can have a hydroxyl number which can vary over a wide range. In general, the hydroxyl number of the polyols employed can range from about 20, and lower, to about 1,000, and higher, preferably from about 20 to 800, and more preferably, from 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where
OH = hydroxyl number of the polyol
f = average functionality, that is, the average number of hydroxyl groups per molecule of polyol
M.W. = average molecular weight of the polyol The exact polyol employed depends upon the end-use of the polyisocyanurate foam. The molecular weight and the hydroxyl number are selected properly to result in flexible, semi-flexible, semi-rigid or rigid products. The polyol preferably possesses a hydroxyl number of from about 200 to about 1,000 when employed in rigid formulations, from about 50 to about 250 for semi-flexible foams, and from about 20 to 70 or more when employed in flexible foam formulations. Such limits are not intended to be restrictive, but are merely illustrative of the large number of possible combinations of the polyols that can be employed.

Greatly preferred polyether or polyester polyols have a hydroxyl number within a range of from about 100 to about 500, and a molecular weight from about 100 to about 1,000.

Foaming is accomplished by employing in a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about −40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,3,4,4,4-nonafluorobutane, hexafluorocyclobutene, and octofluorocyclobutane. Other useful blowing agents include water and low-boiling hydrocarbons such as butane, pentane, hexane, cyclohexane, and the like. Many other compounds easily volatilized by the exotherm of the isocyanato-reactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In addition to the alkali metal tertiaryamino dithiocarbamate salt catalysts an additional isocyanurate group formation catalyst or catalysts to promote trimerization may also be employed. Such catalysts include strong bases, alkali metal salts of carboxylic acids, non-basic metal salts of carboxylic acids and aliphatic tertiary amines. For example, suitable strong bases include quaternary ammonium hydroxide, alkali metal hydroxide and alkali metal alkoxides. Suitable alkali metal salts of carboxylic acids include, for example, sodium acetate, potassium octoate, potassium acetate, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris(dimethylaminomethyl)phenol, and N,N',N''-tri(dimethylaminopropyl)hexhydra-s-triazine and the like.

The particular amount of tertiaryamino dithiocarbamate salt catalyst employed can vary over a wide range and is not critical so long as it is present in an amount sufficient to promote trimerization of the isocyanate mixture. Preferably, the catalyst is added in an amount of about 0.0005 to about 0.025 equivalents for each equivalent of isocyanate employed. An optimum amount would be from about 0.001 to about 0.01 equivalents per equivalent of isocyanate. Expressed in other terms, the catalyst is preferably added in an amount of from about 0.03 up to about 5.0 parts by weight, based upon the total foam formulation, i.e., 100 parts by weight.

If desirable, the isocyanurate foams of the invention can be formulated to include flame retardant components to improve the fire retardancy of the foams. Any known fire retardant component compatible with rigid isocyanurate foams can be employed. This would include both the reactive and additive type fire retardants. Representatives of the additive types include halogenated organic phosphates such as tris(chloroethyl)phosphate, tris(2,3-dibromopropyl)phosphate, triphenyl phosphite, diammonium phosphate, and antimony oxide. Representatives of the chemically bound types are diethyl-N,N'-bis(2-hydroxyethyl)aminomethyl phosphonate, chlorendic acid derivatives, and phosphorous-containing polyols. When employed, the fire retardant component is added to the above-described isocyanate mixture with some other component or as a preformed mixture with some other component described hereinbefore, in an amount of about 1 to about 20 wt.% of the total foam formulation.

Furthermore, fillers can be employed in the preparation of the isocyanurate foams, if desired in amounts within the range of about 0.1 to about 20 wt.% of the total foam formulation. Any conventional filler known in the art to be compatible with isocyanurate foam manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block co-polymer of a silane. The latter type of silicone oil is disclosed in U.S. Pat. No. 2,834,748. Other surfactants or emulsifying or dispersing agents which may be used include ethylene oxide modified sorbitan, monopalmitate or ethylene oxide modified polypropylene ether glycol.

The amount of polyol employed in relation to the organic aromatic polyisocyanate is not critical, but preferably ranges in an amount of from about 0.1 to about 0.8 equivalents per equivalent of polyisocyanate. Optimally, about 0.2 to about 0.6 equivalents per equivalent of polyisocyanate is employed. Moreover, the polyol can be added to the polyisocyanate as a separate component or as a preformed mixture with one or more of the other components.

To prepare the isocyanurate foams of the invention, the above discussed ingredients may be simultaneously, or independently intimately mixed with each other by the so-called "one-shot" method to provide a foam by a one-step process. Proportions of ingredients are properly adjusted to give flexible, rigid, semi-flexible or semi-rigid foams. In preparing flexible foams usually water is also employed as part of the blowing agent. In addition to the "one-shot" method the "quasi-prepolymer method" may also be employed. Here, a portion of the polyol is reacted in the absence of a catalyst with the polyisocyanate component. Thereafter to prepare a suitable foam, the remaining portion of the polyol is added and reaction allowed to go to completion in the presence of catalyst along with other appropriate additives such as blowing agents, foam stabilizing agents, fire retardants, etc.

Again, the isocyanurate foams of the present invention may be prepared over a wide range of temperatures. However, normally, the reaction is initiated at room temperature, and the only heat involved is that generated by the polymerization itself.

The invention will be illustrated further with respect to the following specific examples, which are given by way of illustration and not as limitations on the scope of this invention.

EXAMPLE I

To a 3-necked round bottom flask equipped with a mechanical stirrer, addition funnel and reflux condenser was added 3.12 grams of 90% potassium hydroxide, 100 ml. of water and 60 grams of N-methylpiperazine. The solution was cooled to 20° C with an ice bath and thereafter 38 grams of carbon disulfide was added drop-wise. When the addition of carbon disulfide had been completed, 100 ml. toluene was added and a Dean-Stark trap placed on the flask. The water was azeotroped off, followed by distillation of toluene. The solid salt was then dissolved in an equal amount of diethylene glycol to give a 50% solution of potassium N-methylpiperazine dithiocarbamate.

EXAMPLE II

Here a foam was prepared utilizing the catalyst of Example I. Specifically, an aromatic polyisocyanate in an amount of 116 grams was mixed with 51 grams of a polyol having a OH No. of 192 and functionality of 2.25, 1.0 grams of silicone polyether, 24 grams of trichloromonofluromethane blowing agent and 8 grams of a 50% solution of the catalyst of Example I. The specific polyisocyanate utilized was a methylene-bridged polyphenyl polyisocyanate mixture containing about 46% by weight methylene diphenyl isocyanate isomers, of which about 20% is the 2,4'-isomer, and the remainder being higher functionality and higher molecular weight polymethylene polyisocyanates which have an average functionality of about 2.7.

The above reactants were then mixed, using a drill press for 3 seconds and then poured to give a foam with a 7 second cream time and 60 second rise time.

EXAMPLE III

Here, an additional foam was prepared using the components of Example II. In addition to the potassium N-methylpiperazine dithiocarbamate catalyst, potassium octoate was also utilized as a catalyst source. The potassium octoate was dissolved in a propylene oxide adduct of glycerine, having a molecular weight of around 700. To make the specific foam 118.8 grams of polyisocyanate, 52.2 grams of the polyol of Example II, 1.0 grams of silicone oil, 24 grams of fluorocarbon, 4.0 grams of a 50% solution of potassium N-methyl piperazine dithiocarbamate in diethylene glycol and 1.4 grams of a 50% solution of potassium octoate in the glycerine-based polyol were utilized. The reaction mixture was mixed using a drill press for about 3 seconds and poured to give a foam with a 9 second cream time and a 45 second rise time.

EXAMPLE IV

Yet another foam was prepared as follows. The ingredients of Example II were utilized in the following proportions: 111 grams of polyisocyanate, 50 grams of the polyol of Example II, 1 gram silicone oil, 24 grams of fluorocarbon and 16 grams of a 33% solution of sodium N-methylpiperazine dithiocarbamate in N,N-dimethylformamide. The reactants were then mixed using a drill press for 5 seconds and poured to give a foam with a cream time of 8 seconds and a rise time of 150 seconds.

EXAMPLE V

Here, the foam procedure of Example II was followed with the exception that 4 grams of solid potassium N-methylpiperazine dithiocarbamate was used as the catalyst. A foam with a 12 second cream time and a 180 second rise time was produced.

EXAMPLE VI

Here, a foam similar to that prepared in Example II was made and its properties further explored. Specifically 155.4 grams of the polyol of Example II, 3 grams of silicone polyether, 72 grams of fluorocarbon and 24 grams of the catalyst of Example I along with 345.6 grams of polyisocyanate were used in making an appropriate foam.

The foam had a density of 2.10 pcf, a K-factor of 0.114, a 38.05 psi compression strength with rise, a 5.85 psi compression strength cross rise and a heat distortion of 180° C. The foam had 95.70 percent closed cells, and a dimensional stability after one week at 158° F, 100% room humidity of 5.0 percent increase in volume, 0.4 percent decrease in weight and 3.0 percent increase in linearity. Its dimensional stability at 180° F under dry conditions were +3.1 percent change in volume, −1.5 percent change in weight and +2.0 percent change in linearity. At −20° F under dry conditions the change in volume was −10.9 percent, change in weight −5.6 percent, and change in linearity −7.8 percent.

In the Butler Chimney Test (Kreuger, O. A. and Jackson, D. E., J. Cellular Plastics, 3, 497–501, 1967) the percent weight retained was 63.7 percent, the seconds to extinguish were 27 and the flame height was greater than 11 inches.

Lastly, the friability under the ASTM C-421(1961) Test 2as 2.4 percent weight loss.

EXAMPLE VII

Here, the potassium salt of N,N-dimethylaminopropyl dithiocarbamate was prepared. A solution of 62.3 grams of a 90% potassium hydroxide solution was dissolved in 175 grams of water, and cooled to 0° C to which was added 126 ml. of dimethylaminopropyl amine (1.0 mole) over a period of 20 minutes at a temperature less than 5° C. Thereafter 61 ml. of carbon disulfide (1.0 mole) was added to the basic amine solution in 45 minutes at a temperature of less than 5° C. The structure of the dithiocarbamate salt was confirmed by various analytical techniques.

EXAMPLE VIII

Here, a foam was made utilizing the catalyst of Example VII.

Specifically as a polyol source 9.9 grams of a nitrogen-containing polyol formed by condensing diethanolamine, formaldehyde and nonylphenol followed by addition of propylene oxide, 6.6 grams of polyethylene glycol, 0.5 grams of silicone polyether and 14.0 grams of fluorocarbon blowing agent were added to 62.0 grams of the polyisocyanate described in Example II previously combined with 5.0 grams tris(chloroethyl)phosphate.

Foams were prepared at approximately room temperature under a 40% humidity with a mixing time of 3–4 seconds.

In each instance 2.0 grams of the catalyst of Example VII was utilized in preparing the foam samples.

Results are as follows:

|  | Sample I | Sample II | Sample III |
|---|---|---|---|
| Cream time - sec. | 5 | 4 | 4 |
| Tack-free time - sec. | 23 | 23 | 23 |
| Rise time - sec. | 28 | 28 | 25 |
| Exotherm peak - °C | 151 | 149 | 150 |
| Skin appearance | Good | Good | Good |
| Surface friability | None | None | None |
| Cure time | Fast | Fast | Fast |
| Shrinkage | Very Slight | Very Slight | Very Slight |

EXAMPLE IX

Yet another foam was prepared using the following formulation: 22.2 grams of the polyol of Example II, 0.5 grams silicone polyether, 13.0 grams of fluorocarbon, 56.3 grams of polymethylenepolyphenol polyisocyanate mixture, 5.0 grams tris (cloroethyl)phosphate and 2 grams of the catalyst prepared as outlined in Example VII. Foam results were as follows: cream time — 2 seconds; tack-free time — 10 seconds; rise time — 10 seconds; exotherm peak — 159° C; cure — fast; surface friability — none; foam appearance including skin appearance — good; and cell structure appearance — good. No shrinkage of cells was noted.

EXAMPLE X

Here, the potassium salt of N,N-dimethylaminopropyl (N'-cyanoethyl) dithiocarbamate was prepared as generally outlined in Example VII, with the exception that the starting material was N,N-dimethyl, N'-cyanoethylaminopropylamine prepared by first reacting N,N-dimethylaminopropylamine with acrylonitrile.

Excellent foams were prepared using this catalyst.

Additional confirming foam runs were made utilizing catalysts described above. Fast curing foams were made which nevertheless could be properly processed. In each instance the foams had good dimensional stability, resistance to heat distortion effects, good flammability resistance, and low friability. In addition, and most importantly, the catalyst had a suitable cure time such that proper end-cure was achieved within the sought-after time. Both cream time and rise times were acceptable.

It is to be understood that the above examples are given for the purpose of illustration and that a wide variety of polyisocyanates, inert blowing agents, foam stabilizers, polyols, etc. can be used with equal facility employing the catalysts herein described, providing that the teachings of the disclosure are followed.

Although the invention has been described in considerable detail in the foregoing disclosure, it is to be understood that such details are solely for the purpose of illustration and that many variations can be made by those skilled in the art without departing from the spirit and scope of the invention except as set forth in the claims.

What is claimed is:

1. In a process for preparing a cellular polymer containing recurring isocyanurate and urethane linkages which polymer comprises the reaction product obtained by bringing together in the presence of a blowing agent a polyether or polyester polyol, an aromatic polyisocyanate, and an isocyanurate group formation catalyst; the improvement which comprises utilizing as said isocyanurate catalyst in at least a catalytic amount an alkali metal tertiaryamino dithiocarbamate salt.

2. In a process for preparing a cellular polymer containing recurring isocyanurate and urethane linkages which polymer comprises the reaction product obtained by bringing together in the presence of a blowing agent a polyether or polyester polyol, an aromatic polyisocyanate, and an isocyanurate group formation catalyst; the improvement which comprises utilizing as said isocyanurate catalyst in at least a catalytic amount a compound selected from the group consisting of

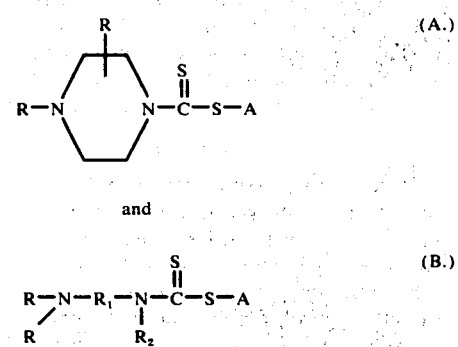

where R is a lower alkyl radical, $R_1$ is a lower alkylene radical, $R_2$ is hydrogen or a lower cyanoalkyl radical, and A represents an alkali metal.

3. The process of claim 2 wherein said polyisocyanate is a methylene-bridged polyphenyl polyisocyanate.

4. The process of claim 2 wherein said isocyanurate catalyst is

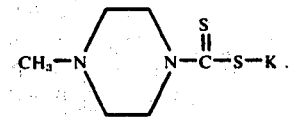

5. The process of claim 2 wherein said isocyanurate catalyst is

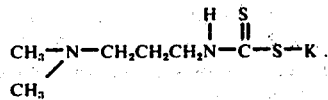

6. The process of claim 2 wherein said isocyanurate catalyst is

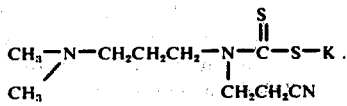

* * * * *